(12) United States Patent
Kinugasa et al.

(10) Patent No.: US 7,128,676 B2
(45) Date of Patent: Oct. 31, 2006

(54) FAILSAFE HYDRAULIC CIRCUIT

(75) Inventors: Seiichi Kinugasa, Anjo (JP); Masanori Onoda, Anjo (JP); Kazuhito Enomoto, Anjo (JP); Kiyotomo Miura, Anjo (JP); Naoyuki Fukaya, Anjo (JP); Satoru Wakuta, Anjo (JP); Masatoshi Adachi, Toyota (JP); Akira Murakami, Toyota (JP)

(73) Assignees: Aisin AW Co., LTD, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 193 days.

(21) Appl. No.: 10/976,237

(22) Filed: Oct. 29, 2004

(65) Prior Publication Data

US 2005/0137043 A1 Jun. 23, 2005

(30) Foreign Application Priority Data

Oct. 30, 2003 (JP) .............................. 2003-371354

(51) Int. Cl.
*F16H 3/72* (2006.01)
*F16H 31/00* (2006.01)

(52) U.S. Cl. .......................................... 475/5; 475/119

(58) Field of Classification Search .................... 475/5, 475/119; 192/87.14, 87.18
See application file for complete search history.

(56) References Cited

U.S. PATENT DOCUMENTS 3,623,568 A 11/1971 Mori

| | | | |
|---|---|---|---|
| 6,055,876 A * | 5/2000 | Kato | 73/866.5 |
| 6,375,591 B1 * | 4/2002 | Wakahara et al. | 475/119 |
| 6,554,736 B1 | 4/2003 | Takano et al. | |
| 2003/0064849 A1 | 4/2003 | Saitou et al. | |
| 2003/0064854 A1 | 4/2003 | Kotani | |
| 2003/0078134 A1 | 4/2003 | Kojima et al. | |
| 2004/0084233 A1 | 5/2004 | Wakuta et al. | |

FOREIGN PATENT DOCUMENTS

| | | |
|---|---|---|
| JP | 47-31773 | 8/1972 |
| JP | 2002-225578 A | 8/2002 |
| JP | 2003-49937 A | 2/2003 |
| JP | 2003-16433 A | 4/2003 |
| JP | 2003-106433 A | 4/2003 |

\* cited by examiner

*Primary Examiner*—Dirk Wright
(74) *Attorney, Agent, or Firm*—Sughrue Mion, PLLC

(57) ABSTRACT

A failsafe hydraulic circuit designed to avoid simultaneous engagement of two friction engagement elements (e.g., clutches, brakes, etc.) incorporated in a speed change apparatus of a motor vehicle or the like. If a first failsafe valve is in the open position state and a first engaging pressure is supplied to a first hydraulic servo via the first failsafe valve, the first engaging pressure is also input to a first oil pressure switch via a second failsafe valve being in the closed position state. Therefore, using the first oil pressure switch, it can be detected that the first engaging pressure is supplied to the first hydraulic servo. Furthermore, if the first engaging pressure is, for example, greater than the set pressure of the first oil pressure switch, this situation can also be detected. Such detections provide confirmation of normal operation of the first failsafe valve and the second failsafe valve.

14 Claims, 3 Drawing Sheets

FAILSAFE HYDRAULIC CIRCUIT

BACKGROUND OF THE INVENTION

The disclosure of Japanese Patent Application No. 2003-371354 filed on Oct. 30, 2003, including the specification, drawings and abstract is incorporated herein by reference in its entirety.

1. Field of the Invention

The present invention relates to a failsafe hydraulic circuit designed to avoid simultaneous engagement of two friction engagement elements (e.g., clutches, brakes, etc.) incorporated in, for example, a speed change apparatus of a motor vehicle or the like.

2. Description of the Related Art

A speed change apparatus installed in a motor vehicle or the like has a plurality of clutches and brakes that are engaged and disengaged on the basis of the engaging pressures supplied to hydraulic servos. Among these clutches and brakes, the clutches and brakes that need to avoid simultaneous engagement are provided with failsafe hydraulic circuits.

A known failsafe hydraulic circuit as mentioned above is equipped with a failsafe valve and an oil pressure switch (oil pressure detector device), as disclosed in, for example, Japanese Patent Application Laid-Open Publication No. 2003-49937.

For example, an oil supplying passage to the hydraulic servo of a specific friction engagement element is provided with a failsafe valve that operates to prevent the supply of oil pressure to the specific hydraulic element, using as a signal pressure the oil pressure supplied to the hydraulic servo of a friction engagement element that should not engage simultaneously with the specific friction engagement element in order to achieve a related shift speed. In order to check the operation of the failsafe valve, line pressure is connected to a portion of the valve, and the introduction and shutoff of the line pressure is detected by the oil pressure switch.

However, the above-described failsafe hydraulic circuit has the following problem. That is, although the oil pressure switch is able to detect whether the operation of the failsafe valve is normal, it is impossible to acquire further information, for example, information regarding the engaging pressure supplied to the hydraulic servo or the like.

SUMMARY OF THE INVENTION

It is an aspect of the present invention to provide a failsafe hydraulic circuit capable of acquiring information regarding the engaging pressure in addition to checking the operation of the failsafe valve, by inputting an engaging pressure to an oil pressure switch.

In a first aspect of the present invention, a failsafe hydraulic circuit for avoiding simultaneous engagement of a first friction engagement element that is engaged and disengaged by a first hydraulic servo and a second friction engagement element that is engaged and disengaged by a second hydraulic servo, includes: an oil pressure generator device that generates an oil pressure to be supplied to the first hydraulic servo or the second hydraulic servo; a first failsafe valve that assumes an open position that allows supply of a first engaging pressure to the first hydraulic servo, and a closed position where the supply of the first engaging pressure to the first hydraulic servo is stopped and the first engaging pressure is discharged from the first hydraulic servo; a first oil pressure detector device that detects an oil pressure output from the first failsafe valve; a second failsafe valve that assumes an open position that allows supply of a second engaging pressure to the second hydraulic servo, and a closed position where the supply of the second engaging pressure to the second hydraulic servo is stopped and the second engaging pressure is discharged from the second hydraulic servo; and a second oil pressure detector device that detects an oil pressure output from the second failsafe valve. In the failsafe hydraulic circuit, a hydraulic circuit in which when one of the first failsafe valve and the second failsafe valve is in an open position state, another one of the first failsafe valve and the second failsafe valve is set to a closed position state is formed by inputting the oil pressure generated by the oil pressure generator device to the first failsafe valve and the second failsafe valve. The first engaging pressure is input to the first oil pressure detector device via the second failsafe valve. The second engaging pressure is input to the second oil pressure detector device via the first failsafe valve.

According to the first aspect of the present invention, if the first failsafe valve is in the open position state and the first engaging pressure is supplied to the first hydraulic servo via the first failsafe valve, the first friction engagement element is engaged by the first engaging pressure. In this case, the second failsafe valve is set to the closed position state by the first engaging pressure, so that the second hydraulic servo is not supplied with the second engaging pressure. Therefore, the second friction engagement element is not engaged.

Likewise, if the second failsafe valve is in the open position state and the second engaging pressure is supplied to the second hydraulic servo via the second failsafe valve, the second friction engagement element is engaged by the second engaging pressure. In this case, the first failsafe valve is set to the closed position state by the second engaging pressure, so that the first hydraulic servo is not supplied with the first engaging pressure. Therefore, the first friction engagement element is not engaged. Thus, in the failsafe hydraulic circuit, while one of the hydraulic servos is supplied with the engaging pressure via one of the failsafe valves and therefore one of the friction engagement elements is engaged, the other hydraulic servo is not supplied with the engaging pressure via the other failsafe valve, and therefore the other friction engagement element is not engaged. That is, an event where one of the friction engagement elements and the other one are simultaneously engaged is avoided.

Furthermore, the hydraulic circuit in which when one of the first failsafe valve and the second failsafe valve is in the open position state, the other one of the failsafe valves is set to the closed position state is formed by inputting the oil pressure generated by the oil pressure generator device to the first and second failsafe valves. The first engaging pressure is input to the first oil pressure detector device via the second failsafe valve. The second engaging pressure is input to the second oil pressure detector device via the first failsafe valve. Therefore, the failsafe hydraulic circuit is able to detect whether the operation of the failsafe valves is normal, and is also able to detect the engaging pressure supplied to each hydraulic servo.

According to a second aspect of the present invention, the engaging pressure adjusted by a first linear solenoid valve and the engaging pressure adjusted by a second linear solenoid valve can be directly supplied to the first failsafe valve and the second failsafe valve, respectively. Therefore, it becomes possible to simplify the overall structure in comparison with, for example, a structure in which a control pressure (signal pressure) is generated by a linear solenoid valve and, on the basis of the control pressure, the pressure adjustment is accomplished by a different valve.

According to a third aspect of the present invention, if the engaging pressure is supplied from one of the two linear solenoid valves to a corresponding one of the two failsafe valves, the other failsafe valve can be reliably set to the closed position state by the engaging pressure from the one of the linear solenoid valves, regardless of whether the engaging pressure is supplied from the one of failsafe valves to a corresponding one of the hydraulic servo.

According to a fourth aspect of the present invention, the oil pressure that linearly corresponds to the engaging pressure supplied to one of the two hydraulic servos can be input to a corresponding one of the two oil pressure detector devices, so that the engaging pressure supplied to the one of the hydraulic servos can be relatively directly detected.

According to a fifth aspect of the present invention, the two brakes that need to avoid simultaneous engagement can be prevented from simultaneously engaging.

According to a sixth aspect of the present invention, the two clutches that need to avoid simultaneous engagement can be prevented from simultaneously engaging.

DETAILED DESCRIPTION OF THE EXEMPLARY EMBODIMENTS

Figure 1:
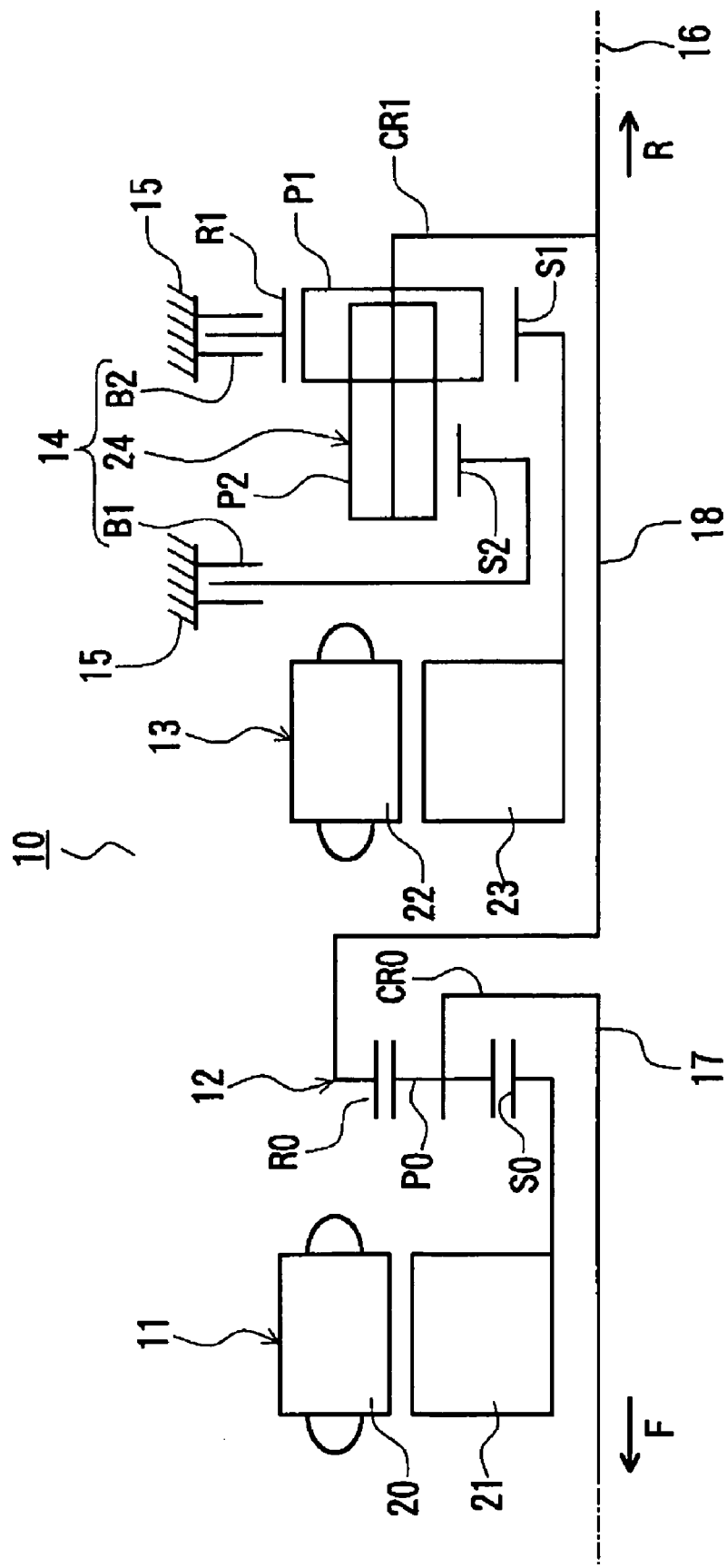
FIG. 1 is a skeleton diagram schematically illustrating a hybrid drive apparatus to which a failsafe hydraulic circuit in accordance with the present invention is applied.

Exemplary embodiments of the present invention will be described hereinafter with reference to the accompanying drawings. In the drawing, like reference numerals and characters are used to denote components or the like which have like structures or carry out like operations. Repeated descriptions of such components or the like are appropriately avoided.

<Embodiment 1>

A failsafe oil passage structure 30 (see FIGS. 2 and 3) in accordance with the present invention is applicable to, for example, a hybrid drive apparatus mounted in a motor vehicle.

With reference to the skeleton diagram shown in FIG. 1, an overall structure of a hybrid drive apparatus 10 will be briefly described. In FIG. 1, the direction of an arrow F indicates a forward side (engine side) of a motor vehicle, and the direction of an arrow R indicates a rearward side (differential device side) of the motor vehicle.

As shown in FIG. 1, the hybrid drive apparatus 10 has a first electric motor 11, a power splitting planetary gear 12, a second electric motor 13, and a speed change apparatus 14 which are disposed in that order from the forward side to the rearward side. These components and the like are contained in a case 15, and are arranged around an axis 16 (the center axis of an input shaft 17 and an output shaft 18). The case 15 has been formed into an integral body by joining a plurality of divided cases in a forward-rearward direction, that is, an axial direction (i.e., the direction along the axis 16). In the description below, the plain term of "axial direction" means the directions along the axis 16. This axial direction is the same as the axial direction of the input shaft 17, the output shaft 18 and a drive shaft 31 that is described below.

The first electric motor 11 has a stator 20 that is fixed to the case 15, and a rotor 21 that is rotatably supported at a position radially inward of the stator 20 (hereinafter, a side relatively close to the axis 16 will be referred to as "radially inward side", and a side relatively remote from the axis 16 will be referred to as "radially outward side"). The rotor 21 of the first electric motor 11 is connected to a sun gear S0 of the power splitting planetary gear 12 described below. The first electric motor 11 mainly generates electric power from the power input via the sun gear S0, so as to drive the second electric motor 13 via an inverter (not shown) or charge an HV battery (hybrid drive-purpose battery (not shown)).

The power splitting planetary gear 12 is formed by a single-pinion planetary gear that is disposed coaxially with the input shaft 17. The power splitting planetary gear 12 has a carrier CR0 that supports a plurality of pinions P0, and the sun gear S0 meshing with the pinions P0, and a ring gear R0 meshing with the pinions P0. The carrier CR0 of the power splitting planetary gear 12 is connected to the input shaft 17, and the sun gear S0 thereof is connected to the rotor 21 of the first electric motor 11, and the ring gear R0 thereof is connected to the output shaft 18. The power splitting planetary gear 12 distributes the drive power input to the carrier CR0 via the input shaft 17, to the first electric motor 11 side via the sun gear S0 and to the output shaft 18 side via the ring gear R0, on the basis the rotation control of the first electric motor 11. The drive power distributed to the first electric motor 11 is used for generating electric power whereas the drive power distributed to the output shaft 18 is used for driving the motor vehicle.

The second electric motor 13 has a stator 22 that is fixed to the case 15, and a rotor 23 that is rotatably supported at a radially inward side of the stator 22. The rotor 23 of the second electric motor 13 is connected to a sun gear S1 of the speed change apparatus 14 described below. Similar to the first electric motor 11, the second electric motor 13 is connected to the HV battery via the inverter. However, main functions of the second electric motor 13 are different from those of the first electric motor 11. Unlike the first electric motor 11 used mainly for electric power generation, the second electric motor 13 mainly functions as a drive motor to add to the power (drive power) of the motor vehicle. However, during braking or the like, the second electric motor 13 functions as a generator to regenerate the inertial force of the vehicle into electric energy.

The speed change apparatus 14 has a generally-termed Ravigneaux type planetary gear unit 24 that includes a double-pinion planetary gear and a single pinion planetary gear that shares one of pinions with the double-pinion planetary gear. The speed change apparatus 14 further has a first brake B1 and a second brake B2.

The planetary gear unit 24 of the speed change apparatus 14 includes two sun gears S1, S2, pinions P1, long pinions P2 that are shared by the two planetary gears, a carrier CR1 that supports the pinions P1 and the long pinions P2, and a ring gear R1. Of the two types of pinions P1, P2, the pinions P1 mesh with the sun gear S1 and the ring gear R1, and the pinions P2 mesh with the sun gear S2 and the pinions P1. The ring gear R1 of the planetary gear unit 24 is connected to the first brake B1, and the sun gear S2 thereof is connected to the second brake B2. As the entire speed change apparatus 14, the sun gear S1 that serves as an input member is connected to the rotor 23 of the second electric motor 13, and the carrier CR1 that serves as an output member is connected to the output shaft 18. The speed change apparatus 14 is designed to change between two reduced speeds of different speed reduction ratios by engaging one of the first and second brakes B1, B2 while releasing the other one of the brakes, or by releasing the one of the two brakes while engaging the other one of the brakes. That is, the speed change apparatus 14 changes the magnitude of drive power input from the second electric motor 13 via the sun gear S1, and transfers the changed magnitude of drive power to the output shaft 18 via the carrier CR1 and the ring gear R0. In this embodiment, the high (Hi) gear speed is achieved by engaging the first brake B1 while releasing the second brake B2, and the low (Lo) gear speed is achieved by engaging the second brake B2 while releasing the first brake B1.

In the hybrid drive apparatus 10 structured as described above, the power input from the engine to the input shaft 17 is distributed to the first electric motor 11 and the output shaft 18 by the power splitting planetary gear 12. Drive power from the second electric motor 13 is transferred to the output shaft 18 via the speed change apparatus 14. That is, the drive power from the engine and the drive power from the second electric motor 13 are combined and output to the output shaft 18.

A failsafe hydraulic circuit 30 in accordance with the embodiment engages and disengages the first brake (first friction engagement element) B1 and the second brake (second friction engagement element) B2 of the speed change apparatus 14 shown in FIG. 1. In this case, the failsafe hydraulic circuit 30 is used to avoid simultaneous engagement of the first friction engagement element B1 and the second friction engagement element B2.

Figure 2:
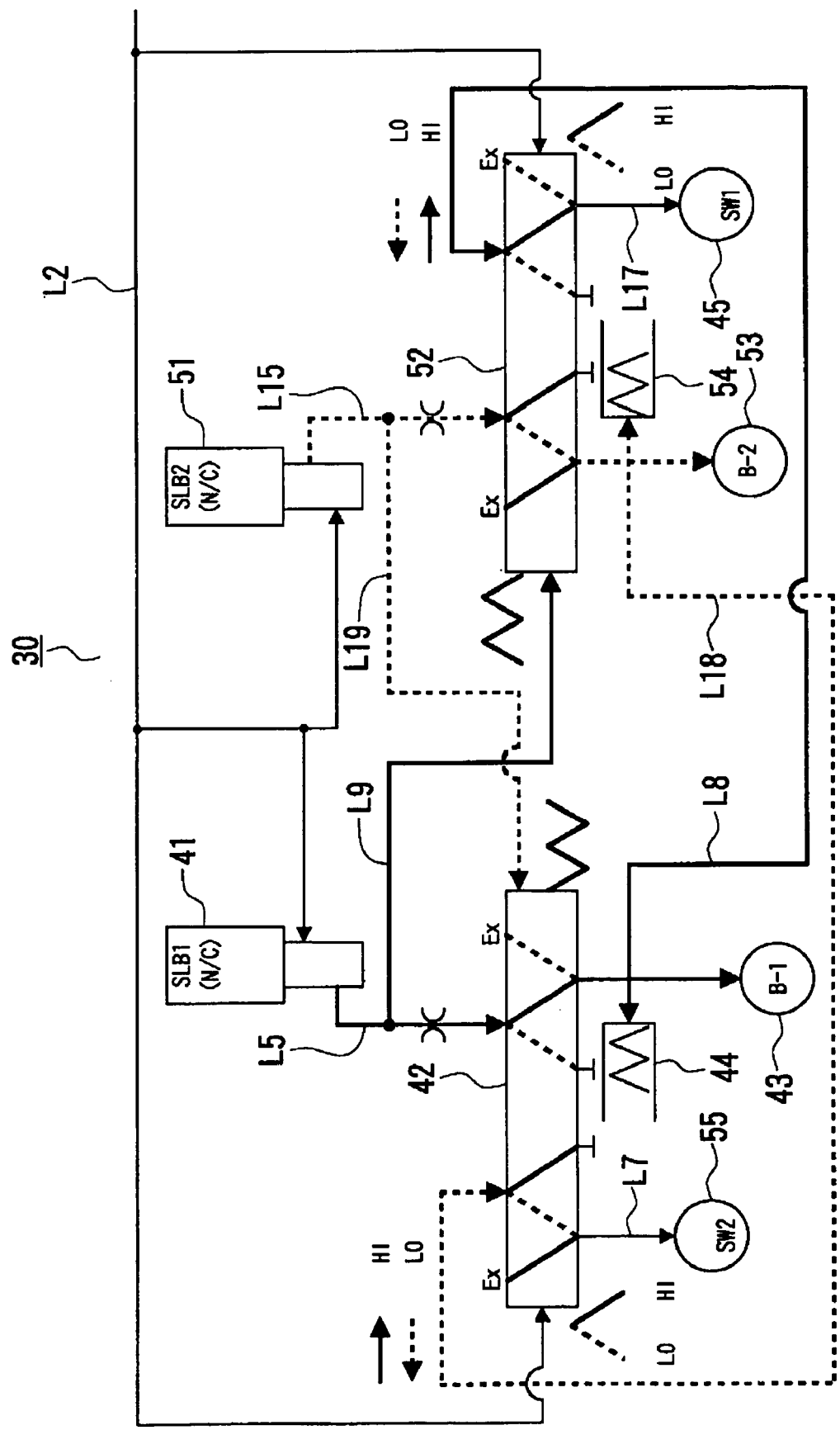
FIG. 2 is a schematic diagram illustrating a failsafe hydraulic circuit in accordance with the present invention.
Figure 3:
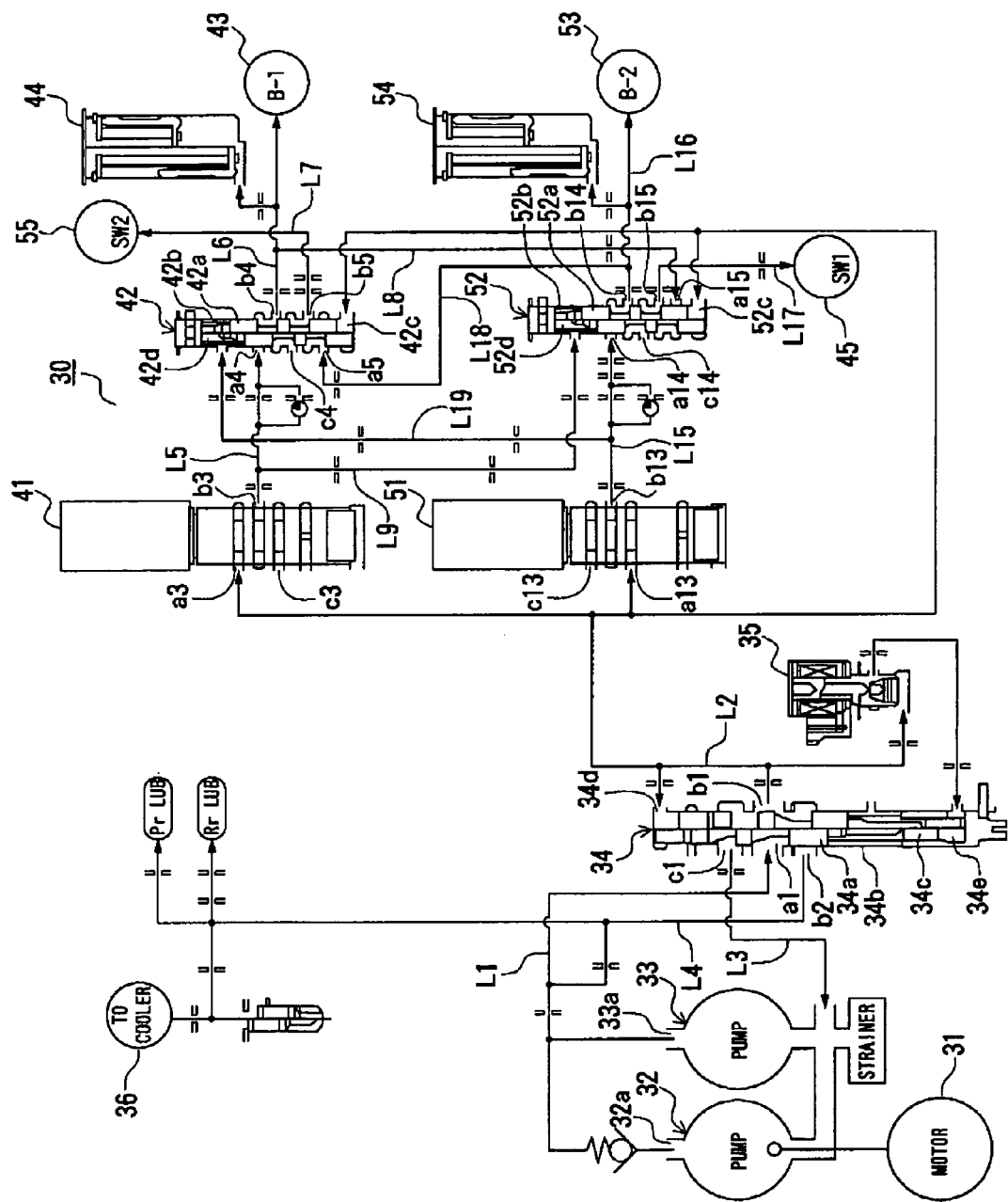
FIG. 3 is a diagram illustrating a hydraulic circuit to which a failsafe hydraulic circuit in accordance with the present invention is applied.

FIG. 2 is a schematic diagram illustrating an example of the failsafe hydraulic circuit 30 in accordance with the present invention. FIG. 3 is a diagram illustrating a hydraulic circuit to which the failsafe hydraulic circuit 30 according to the present invention is applied.

In the hydraulic circuit shown in FIG. 3, oil pressure is generated by driving an oil pump 32 via an electric motor 31, or driving an oil pump 33 via the engine. The generated oil pressure is adjusted to a line pressure by a modulator valve 34. The thus-adjusted line pressure is supplied to the failsafe hydraulic circuit 30. On the basis of the line pressure, the failsafe hydraulic circuit 30 engages or disengages the first brake B1 and the second brake B2 of the speed change apparatus 14 so as to change the speed change apparatus 14 between the Hi gear speed and the Lo gear speed. In this case, the failsafe hydraulic circuit 30 prevents simultaneous engagement of the first brake B1 and the second brake B2. The failsafe hydraulic circuit 30 also has a structure for checking whether a structure provided for avoiding the simultaneous engagement is normally operating. Detailed description will be given below.

The oil pump 32 that is driven by the electric motor 31 and the oil pump 33 that is driven by the engine have ejection ports 32a, 33a, respectively, for raising the pressure of oil sucked in and ejecting pressurized oil. An oil passage L1 is connected to the ejection ports 32a, 33a. The oil passage L1 is connected to an input port a1 of a manual valve 33.

The modulator valve 34 is formed by a pressure regulating valve which includes a spool 34a, a spring 34b that urges the spool 34a upward, and a plunger 34c that contacts a lower end of the spool 34a. The modulator valve 34 has the input port a1 that is connected to the oil passage L1, and an output port b1 connected to an oil passage L2 provided at the failsafe hydraulic circuit 30 side, a drain port c1 connected to a suction side of the oil pumps 32, 33 via an oil passage L3, and an output port b2 connected to an oil passage L4 provided at a cooler 36 side. The spool 34a for controlling the degree of communication among the ports receives different pressures. That is, a direct feedback pressure of the line pressure is applied from an upper oil chamber 34d via an orifice so as to oppose the spring force. Furthermore, a throttle pressure output by a throttle solenoid valve 35 is also applied, as a signal pressure, from a lower oil chamber 34e so as to add to the spring force. When the throttle pressure applied to the modulator valve 34 increases due to an increase in the vehicle run load, the modulator valve 34 reduces the degree of communication to the drain port c1 so as to increase the line pressure output from the output port b1, and supplies surplus pressure from the output port b2 to the cooler 36 or the like via the oil passage L4. Conversely, when the throttle pressure applied to the modulator valve 34 decreases due to a decrease in the vehicle run load, the modulator valve 34 increases the degree of communication to the drain port c1 so as to increase the amount of drainage and therefore decrease the line pressure output from the output port b1. In this manner, the needed line pressure is always properly maintained.

The failsafe hydraulic circuit 30 is supplied with the line pressure from the output port b1 of the manual valve 34, via the oil passage L2. As shown in FIGS. 3 and 2, the failsafe hydraulic circuit 30 includes a first linear solenoid valve 41, a first failsafe valve 42, a first hydraulic servo 43, a first accumulator 44, and a first oil pressure switch 45. The failsafe hydraulic circuit 30 further includes a second linear solenoid valve 51, a second failsafe valve 52, a second hydraulic servo 53, a second accumulator 54, and a second oil pressure switch 55.

The first linear solenoid valve 41 is a pressure regulating valve having an input port a3 that is connected to the oil passage L2, an output port b3 that is connected to an oil passage L5, and a drain port c3. By directly controlling the degrees of communication of these ports, the first linear solenoid valve 41 adjusts the line pressure input via the input port a3 and outputs the adjusted pressure as an engaging pressure from the output port b3. Specifically, during a closed state (not shown) of the first linear solenoid valve 41, the input port a3 and the output port b3 are shut off from each other, and the output port b3 and the drain port c3 are interconnected in communication. During an open state (not shown) of the first linear solenoid valve 41, the input port a3 and the output port b3 are interconnected in communication, and the output port b3 and the drain port c3 are shut off from each other. If, during the open state, the degree of opening is relatively small, a relatively small engaging pressure is output from the output port b3 to the oil passage L5. As the degree of opening increases, the oil pressure output from the output port b3 to the oil passage L5 increases. Thus, the first linear solenoid valve 41 also functions as a switch valve.

The first failsafe valve 42 has a spool 42a, and a spring 42b that urges the spool 42a downward. The first failsafe valve 42 has an input port a4 that is connected to the oil passage L5, an output port b4 that communicates with the first hydraulic servo 43 via an oil passage L6, and a drain port c4. As for the communication among the input port a4, the output port b4 and the drain port c4, when the spool 42a is at an open position (i.e., a position indicated by the right-side half illustration of the spool 42a in FIG. 3), the input port a4 and the output port b4 are interconnected in communication, and the output port b4 and the drain port c4 are shut off from each other. Conversely, when the spool 42a is at a closed position (i.e., a position indicated by the left-side half illustration of the spool 42a in FIG. 3), the input port a4 and the output port b4 are shut off from each other, and the output port b4 and the drain port c4 are interconnected in communication. The line pressure is applied to the spool 42a from a lower oil chamber 42c via the oil passage L2 so as to oppose the spring pressure. Furthermore, the signal pressure is applied to the spool 42a from an upper oil chamber 42d so as to add to the spring pressure. The signal pressure applied to the spool 42a is the engaging pressure that is supplied from the second linear solenoid valve 51 (described below) via oil passages L15, L19 (described below). The first failsafe valve 42 further has an input port a5 to which the engaging pressure from the second failsafe valve 52 (described below) is input, and an output port b5 that communicates with the second oil pressure switch 55 (described below) via an oil passage L7. The input port a5 and the output port b5 are shut off from each other when the spool 42a is at the open position, and are interconnected in communication when the spool 42a is at the closed position.

The first hydraulic servo 43 has a piston, a cylinder, and an oil chamber formed between the piston and the cylinder (none of which is shown). The first hydraulic servo 43 engages or disengages the first brake B1 in accordance with the engaging pressure supplied to the oil chamber via the first failsafe valve 42 and the oil passage L6.

The first accumulator 44 is formed by a spring-type accumulator that is connected to the oil passage L6. The first accumulator 44 performs various functions, including prevention of pulsation of the engaging pressure supplied to and discharged from the first hydraulic servo 43, absorption of surge pressure (sharp fluctuating pressure), etc.

The first oil pressure switch 45 is formed by, for example, a piston-type pressure switch. The first oil pressure switch 45 is connected to the first hydraulic servo 43 via the oil passage L6 extending between the first failsafe valve 42 and the first hydraulic servo 43, an oil passage L8, the second failsafe valve 52 (described below), and an oil passage L17. The first oil pressure switch 45 is able to detect that the first hydraulic servo 43 has reached a predetermined set pressure, by using a built-in microswitch (not shown). The result of detection (detection signal) is sent to a shifting ECU (electronic control unit, not shown) of the speed change apparatus 14, and is compared with, for example, a map indicating a relationship between the first engaging pressure and the value of electric current of the first linear solenoid valve 41, which map is stored beforehand in the ECU. In this manner, it is determined whether the operation of the first failsafe valve 42 and the second failsafe valve 52 is normal. If it is determined that the operation of the failsafe valves is abnormal, the entire hydraulic circuit is changed to a safer side, for example, by prohibiting the shifting or by reducing the outputs of the oil pump 32, 33.

The second linear solenoid valve 51 is a pressure regulating valve having an input port a13 that is connected to the oil passage L2, an output port b13 that is connected to an oil passage L15, and a drain port c13. By directly controlling the degrees of communication of these ports, the second linear solenoid valve 51 adjusts the line pressure input via the input port a13 and outputs the adjusted pressure as an engaging pressure from the output port b13. Specifically, during a closed state (not shown) of the second linear solenoid valve 51, the input port a13 and the output port b13 are shut off from each other, and the output port b13 and the drain port c13 are interconnected in communication. During an open state (not shown) of the second linear solenoid valve 51, the input port a13 and the output port b13 are interconnected in communication, and the output port b13 and the drain port c13 are shut off from each other. If, during the open state, the degree of opening is relatively small, a relatively small engaging pressure is output from the output port b13 to the oil passage L15. As the degree of opening increases, the oil pressure output from the output port b13 to the oil passage L15 increases. Thus, the second linear solenoid valve 51 also functions as a switch valve.

The second failsafe valve 52 has a spool 52a, and a spring 52b that urges the spool 52a downward. The second failsafe valve 52 has an input port a14 that is connected to the oil passage L15, an output port b14 that communicates with the second hydraulic servo 53 via an oil passage L16, and a drain port c14. As for the communication among the input port a14, the output port b14 and the drain port c14, when the spool 52a is at an open position (i.e., a position indicated by the right-side half illustration of the spool 52a in FIG. 3), the input port a14 and the output port b14 are interconnected in communication, and the output port b14 and the drain port c14 are shut off from each other. Conversely, when the spool 52a is at a closed position (i.e., a position indicated by the left-side half illustration of the spool 52a in FIG. 3), the input port a14 and the output port b14 are shut off from each other, and the output port b14 and the drain port c14 are interconnected in communication. The line pressure is applied to the spool 52a from a lower oil chamber 52c via the oil passage L2 so as to oppose the spring pressure. Furthermore, the signal pressure is applied to the spool 52a from an upper oil chamber 52d so as to add to the spring pressure. The signal pressure applied to the spool 52a is the engaging pressure that is supplied from first linear solenoid valve 41 via oil passages L5, L9. The second failsafe valve 52 further has an input port a15 to which the engaging pressure from the first failsafe valve 42 is input, and an output port b15 that communicates with the first oil pressure switch 45 via an oil passage L17. The input port a15 and the output port b15 are shut off from each other when the spool 52a is at the open position, and are interconnected in communication when the spool 52a is at the closed position.

The second hydraulic servo 53 has a piston, a cylinder, and an oil chamber formed between the piston and the cylinder (none of which is shown). The second hydraulic servo 53 engages or disengages the second brake B2 in accordance with the engaging pressure supplied to the oil chamber via the second failsafe valve 52 and the oil passage L16.

The second accumulator 54 is formed by a spring-type accumulator that is connected to the oil passage L16. The second accumulator 54 performs various functions, including prevention of pulsation of the engaging pressure supplied to and discharged from the second hydraulic servo 53, absorption of surge pressure (sharp fluctuating pressure), etc.

The second oil pressure switch 55 is formed by, for example, a piston-type pressure switch. The second oil pressure switch 55 is connected to the second hydraulic servo 53 via the oil passage L16 extending between the second failsafe valve 52 and the second hydraulic servo 53, an oil passage L18, the first failsafe valve 42, and the oil passage L7. The second oil pressure switch 55 is able to detect that the second hydraulic servo 53 has reached a predetermined set pressure, by using a built-in microswitch (not shown). The result of detection (detection signal) is sent to the shifting ECU (electronic control unit, not shown) of the speed change apparatus 14, and is compared with, for example, a map indicating a relationship between the second engaging pressure and the value of electric current of the second linear solenoid valve 51, which map is stored beforehand in the ECU. In this manner, it is determined whether the operation of the second failsafe valve 52 and the first failsafe valve 42 is normal. If it is determined that the operation of the failsafe valves is abnormal, the entire hydraulic circuit is changed to a safer side, for example, by prohibiting the shifting or by reducing the outputs of the oil pump 32, 33.

Next, operations of the failsafe hydraulic circuit 30 will be described with reference to FIGS. 2 and 3. In FIG. 2, solid lines indicate the case where the high (Hi) gear speed is selected, and dotted lines indicate the case where the low (Lo) gear speed is selected. The below description will be made only with regard to operations related to the failsafe hydraulic circuit 30.

When the switch of the motor vehicle is turned on, the electric motor 31 rotates to drive the oil pump 32, so that an oil pressure is generated in the oil passage L1 at the ejection side. This oil pressure is input to the modulator valve 34, and is output therefrom as a line pressure into the oil passage L2. At this time, the first linear solenoid valve 41 and the second linear solenoid valve 51 are in the closed state, so that the line pressure is input to the oil chamber 42c of the first failsafe valve 42 and to the oil chamber 52c of the second failsafe valve 52. Therefore, both the first failsafe valve 42 and the second failsafe valve 52 assume the open position state (indicated by the right-side half illustration in FIG. 3). Specifically, in the first failsafe valve 42, the input port a4 and the output port b4 are interconnected in communication, and the output port b4 and the drain port c4 are shut off from each other. Likewise, in the second failsafe valve 52, the input port a14 and the output port b14 are interconnected in communication, and the output port b14 and the drain port c14 are shut off from each other.

At this stage, the first brake B1 (see FIG. 1) is engaged in order to generate a reaction force for starting the engine. That is, the first linear solenoid valve 41 is set to the open state, so that the line pressure supplied thereto via the oil passage L2 is output as a first engaging pressure into the oil passage L5. The first engaging pressure is supplied to the first hydraulic servo 43 via the input port a4 and the output port b4 of the first failsafe valve 42, which are interconnected in communication, and via the oil passage L6. At this time, the first engaging pressure output to the oil passage L5 is also input as a signal pressure into the oil chamber 52d of the second failsafe valve 52 via the oil passage L9. Therefore, the second failsafe valve 52 changes to the closed position state (indicated by the left-side half illustration in FIG. 3), so that the input port a14 and the output port b14 are shut off from each other. That is, even if the second linear solenoid valve 51 is opened due to a malfunction, the second hydraulic servo 53 is not supplied with the second engaging pressure.

Thus, the first failsafe valve 42 assumes the open position state and the second failsafe valve 52 assumes the closed position state, so that the input port a5 and the output port b5 of the first failsafe valve 42 are shut off from each other, and the input port a15 and the output port b15 of the second failsafe valve 52 are interconnected in communication. Therefore, the first engaging pressure supplied from the first failsafe valve 42 to the first hydraulic servo 43 via the oil passage L6 is input to the first oil pressure switch 45 via the oil passage L6, the oil passage L8, and the input port a15 and the output port b15 of the second failsafe valve 52. In short, the first engaging pressure supplied to the first hydraulic servo 43 is input to the first oil pressure switch 45. Hence, for example, if the set pressure of the first oil pressure switch 45 is set so as to correspond to the engaging pressure that engages the first brake B1, it becomes possible to detect whether the first brake B1 has engaged by monitoring the first oil pressure switch 45. After detection of engagement of the first brake B1, the engine can be rotated by, for example, stopping the second electric motor 13 and rotating the first electric motor 11 and therefore using the first electric motor 11 as a starter. Thus, according to the above-described operation, it can be detected that the first brake B1 has been engaged reliably, and then the engine can be immediately started. Therefore, loss time can be reduced.

If the first failsafe valve 42 is normal and the second failsafe valve 52 is in the open position state due to a failure, the oil pressure from the first failsafe valve 42 is shut off by the second failsafe valve 52, so that the oil pressure on the first oil pressure switch 45 becomes substantially zero. Therefore, it can be determined whether the first and second failsafe valves 42, 52 are both normal by comparing the pre-set state (ON or OFF) of the switch and the state (ON or OFF) detected by the first oil pressure switch 45.

The foregoing description is given in conjunction with the case where during the reaction force control at the time of startup of the engine, the first engaging pressure supplied to the first hydraulic servo 43 is detected by using the first oil pressure switch 45. However, if the second brake B2 is used at the time of the reaction force control, it is appropriate to detect the second engaging pressure supplied to the second hydraulic servo 53 by using the second oil pressure switch 55 similarly to the above-described operation.

Furthermore, according to the present invention, if the set pressures of the first oil pressure switch 45 and the second oil pressure switch 55 are set at appropriate predetermined values, the first engaging pressure supplied to the first hydraulic servo 43 can be detected by the first oil pressure switch 45 and the second engaging pressure supplied to the second hydraulic servo 53 can be detected by the second oil pressure switch 55 at the time of the shifting of the speed change apparatus 14 (see FIG. 1), that is, at the time of engagement changeover between the first brake B1 and the second brake B2. That is, it becomes possible to check whether the engaging pressure supplied to one of the hydraulic servos decreases normally and the engaging pressure supplied to the other one of the hydraulic servos increases normally at the time of engagement changeover through the use of the first oil pressure switch 45 and the second oil pressure switch 55. In conjunction with the engagement changeover, there are cases where the first hydraulic servo 43 and the second hydraulic servo 53 are simultaneously supplied with engaging pressures, that is, cases where the first failsafe valve 42 and the second failsafe valve 52 are simultaneously in the open position state. Such simultaneous supply of engaging pressures occurs when the engaging pressures are relatively low, and therefore does not impede the failsafe functions. However, it is to be noted that when both the first failsafe valve 42 and the second failsafe valve 52 are in the open position state, the engaging pressure is not supplied to either one of the first oil pressure switch 45 and the second oil pressure switch 55 due to the structure of the two valves, and therefore the detection of engaging pressure is impossible.

The normality and abnormality of operation of the first failsafe valve 42 and the second failsafe valve 52, and a detection relationship between the first oil pressure switch 45 and the second oil pressure switch 55 will be summarized below. The following description will be given in conjunction with a case where the first linear solenoid valve 41 and the second linear solenoid valve 51 operate normally. In order to simplify the description, it is assumed that the first oil pressure switch 45 and the second oil pressure switch 55 are off when the set pressure is zero, that is, when the first engaging pressure and the second engaging pressure are not provided, and are on when the first engaging pressure and the second engaging pressure are provided. Under such conditions, the following can be said:

The first oil pressure switch 45 is on only when the first linear solenoid valve 41 is in the open state and both the first failsafe valve 42 and the second failsafe valve 52 are normal. Therefore, if the first linear solenoid valve 41 is in the open state and the first oil pressure switch 45 is on, it can be said that both the first failsafe valve 42 and the second failsafe valve 52 are normal. In other words, if the first linear solenoid valve 41 is in the open state and the first oil pressure switch 45 is off, at least one of the first failsafe valve 42 and the second failsafe valve 52 is abnormal.

The same can be said with regard to the second oil pressure switch 55. That is, the second oil pressure switch 55 is on only when the second linear solenoid valve 51 is in the open state and both the second failsafe valve 52 and the first failsafe valve 42 are normal. Therefore, if the second linear solenoid valve 51 is in the open state and the second oil pressure switch 55 is on, it can be said that both the first failsafe valve 42 and the second failsafe valve 52 are normal. In other words, if the second linear solenoid valve 51 is in the open state and the second oil pressure switch 55 is off, at least one of the first failsafe valve 42 and the second failsafe valve 52 is abnormal.

Thus, according to the embodiment, the first oil pressure switch 45 and the second oil pressure switch 55 allow detection of the normality and abnormality of the first failsafe valve 42 and the second failsafe valve 52, and allow detection of the engaging pressure of the first hydraulic servo 43 and the engaging pressure of the second hydraulic servo 53.

For example, if one of the two failsafe valve is normal and the other one of the two failsafe valve is in the open position state due to a failure, the oil pressure from the one of the failsafe valves is shut off by the other one of the failsafe valves, and therefore the oil pressure detected by the oil pressure detector device is substantially zero. Therefore, by monitoring whether the oil pressure that should normally be detected is actually detected by the oil pressure detector device, it can be detected whether the first and second failsafe valves 42, 52 are both operating normally.

More specifically, if the first failsafe valve 42 is in the open position state and the first engaging pressure is supplied to the first hydraulic servo 43 via the first failsafe valve 42, the first engaging pressure is also input to the first oil pressure switch 45 via the second failsafe valve 52 being in the closed position state. Therefore, using the first oil pressure switch 45, it can be detected that the first engaging pressure is supplied to the first hydraulic servo 43. Furthermore, if the first engaging pressure is, for example, greater than the set pressure of the first oil pressure switch 45, this situation can also be detected. Therefore, if the first engaging pressure supplied to the first hydraulic servo 43 via the first failsafe valve 42 is higher than the aforementioned set pressure, it can at least be confirmed that the first failsafe valve 42 and the second failsafe valve 52 are operating normally. This means that, for example, during a run of the motor vehicle with the first brake B1 engaged, it can be determined whether there is an abnormality in the operation of the first failsafe valve 42 or the second failsafe valve 52 by monitoring only the first oil pressure switch 45 of the two pressure switches, that is, the first oil pressure switch 45 and the second oil pressure switch 55.

Likewise, if the second failsafe valve 52 is in the open position state and the second engaging pressure is supplied to the second hydraulic servo 53 via the second failsafe valve 52, the second engaging pressure is also input to the second oil pressure switch 55 via the first failsafe valve 42 being in the closed position state. Therefore, using the second oil pressure switch 55, it can be detected that the second engaging pressure is supplied to the second hydraulic servo 53. Furthermore, if the second engaging pressure is, for example, greater than the set pressure of the second oil pressure switch 55, this situation can also be detected. Therefore, if the first engaging pressure supplied to the first hydraulic servo 43 via the first failsafe valve 42 is higher than the aforementioned set pressure, it can be confirmed that at least the first failsafe valve 42 and the second failsafe valve 52 are operating normally. This means that, for example, during a run of the motor vehicle with the second brake B2 engaged, it can be determined whether there is an abnormality in the operation of the first failsafe valve 42 or the second failsafe valve 52 by monitoring only the second oil pressure switch 55 of the two pressure switches, that is, the first oil pressure switch 45 and the second oil pressure switch 55.

In a system where oil pressure switches are arranged so as to detect the oil pressure output from one of two failsafe valves without involvement of the other one of the failsafe valves, abnormality can be detected in the case of failure of both the failsafe valve and the linear solenoid valve that are provided for a friction engagement element. In this system, however, abnormality cannot be detected in the case of failure of only the failsafe valve.

In contrast, in the embodiment, abnormality can be detected when either one of the failsafe valves 42, 52 fails. Therefore, it becomes possible to avoid failure of both the linear solenoid valves 41, 51 and the fuel safe valves 42, 52 and therefore avoid the simultaneous engagement of the two friction engagement elements B1, B2.

Although in the foregoing embodiment, the friction engagement elements that need to avoid simultaneous engagement are the first brake B1 and the second brake B2, the present invention is not limited to this structure. For example, the present invention is also applicable if the friction engagement elements that need to avoid simultaneous engagement are two clutches. In this case, substantially the same advantages as stated above can be achieved. Furthermore, although in the foregoing embodiment, the oil pressure switches 45, 55 are provided as oil pressure detector devices, it is also possible to adopt oil pressure sensors capable of linearly detecting oil pressure (not shown) instead of the oil pressures 45, 55. In this case, too, substantially the same advantages as stated above can be achieved.

What is claimed is:

1. A failsafe hydraulic circuit for avoiding simultaneous engagement of a first friction engagement element that is engaged or disengaged by a first hydraulic servo and a second friction engagement element that is engaged or disengaged by a second hydraulic servo, the failsafe hydraulic circuit comprising:

an oil pressure generator device that generates an oil pressure to be supplied to the first hydraulic servo or the second hydraulic servo;

a first valve that has one of an open position that allows a supply of a first engaging pressure to the first hydraulic servo, and a closed position where the supply of the first engaging pressure to the first hydraulic servo is stopped and the first engaging pressure is discharged from the first hydraulic servo;

a first oil pressure detector device that detects an oil pressure output from the first valve;

a second valve that has one of an open position that allows a supply of a second engaging pressure to the second hydraulic servo, and a closed position where the supply of the second engaging pressure to the second hydraulic servo is stopped and the second engaging pressure is discharged from the second hydraulic servo; and a second oil pressure detector device that detects an oil pressure output from the second valve, wherein when one of the first valve and the second valve is set to an open position state, another one of the first valve and the second valve is set to a closed position state by inputting the oil pressure generated by the oil pressure generator device to the first valve and the second valve, and the first engaging pressure is input to the first oil pressure detector device via the second valve, and wherein the second engaging pressure is input to the second oil pressure detector device via the first valve.

2. The failsafe hydraulic circuit according to claim 1, further comprising:

a first linear solenoid valve provided as a first oil pressure generator device for supplying the first engaging pressure to the first hydraulic servo via the first valve; and a second linear solenoid valve provided as a second oil pressure generator device for supplying the second engaging pressure to the second hydraulic servo via the second valve.

3. The failsafe hydraulic circuit according to claim 2, wherein the first engaging pressure that sets the second valve to the closed position state is supplied from an oil passage that directly connects the first linear solenoid valve and the first valve, and wherein the second engaging pressure that sets the first valve to the closed position state is supplied from an oil passage that directly connects the second linear solenoid valve and the second valve.

4. The failsafe hydraulic circuit according to claim 3, wherein the first engaging pressure that is input to the first oil pressure detector device via the second valve being in the closed position state is supplied from an oil passage that directly connects the first valve and the first hydraulic servo, and wherein the second engaging pressure that is input to the second oil pressure detector device via the first valve being in the closed position state is supplied from an oil passage that directly connects the second valve and the second hydraulic servo.

5. The failsafe hydraulic circuit according to claim 4, wherein the first friction engagement element and the second friction engagement element are a first brake and a second brake, respectively.

6. A hybrid drive apparatus comprising:
the failsafe circuit according to claim 5;
a first electric motor and a second electric motor;
a power splitting planetary gear having a first rotating element to which an output of an engine is transferred, a second rotating element that is rotatable in association with the first electric motor, and a third rotating element that is rotatable in association with an output portion; and
a speed change apparatus provided between the second electric motor and the output portion,
wherein the speed change apparatus includes the failsafe circuit.

7. The hybrid drive apparatus according to claim 6, further comprising:
a first oil pump that is driven by at least one of the first electric motor and the second electric motor to generate an oil pressure; and
a second oil pump that is driven by the engine to generate an oil pressure.

8. The failsafe hydraulic circuit according to claim 1, wherein the first engaging pressure that is input to the first oil pressure detector device via the second valve being in the closed position state is supplied from an oil passage that directly connects the first valve and the first hydraulic servo, and wherein the second engaging pressure that is input to the second oil pressure detector device via the first valve being in the closed position state is supplied from an oil passage that directly connects the second valve and the second hydraulic servo.

9. The failsafe hydraulic circuit according to claim 1, wherein the first friction engagement element and the second friction engagement element are first brake and a second brake, respectively.

10. The failsafe hydraulic circuit according to claim 1, wherein the first friction engagement element and the second friction engagement element are a first clutche and a second clutch, respectively.

11. A hybrid drive apparatus comprising:
the failsafe circuit according to claim 1;
a first electric motor and a second electric motor;
a power splitting planetary gear having a first rotating element to which an output of an engine is transferred, a second rotating element that is rotatable in association with the first electric motor, and a third rotating element that is rotatable in association with an output portion; and
a speed change apparatus provided between the second electric motor and the output portion,
wherein the speed change apparatus includes the failsafe circuit.

12. The hybrid drive apparatus according to claim 11, further comprising:
a first oil pump that is driven by at least one of the first electric motor and the second electric motor to generate a first oil pressure; and
a second oil pump that is driven by the engine to generate a second oil pressure.

13. The failsafe hydraulic circuit of claim 1, wherein the first valve is a first failsafe valve and the second valve is a second failsafe valve.

14. A hydraulic circuit comprising:
a means for generating oil pressure to be supplied to the first hydraulic servo or the second hydraulic servo;
a first valve having one of an open position that allows a supply of a first pressure to the first hydraulic servo, and a closed position where the supply of the first pressure to the first hydraulic servo is stopped and the first pressure is discharged from the first hydraulic servo;
a first means for detecting oil pressure output from the first valve;
a second valve having one of an open position that allows a supply of a second pressure to the second hydraulic servo, and a closed position where the supply of the second pressure to the second hydraulic servo is stopped and the second pressure is discharged from the second hydraulic servo; and
a second means for detecting an oil pressure output from the second valve,
wherein when one of the first valve and the second valve is set to an open state, another one of the first valve and the second valve is set to a closed state by inputting the oil pressure generated by the oil pressure generator device to the first valve and the second valve, and the first pressure is input to the first means for detecting oil pressure via the second valve, and
wherein the second pressure is input to the second means for detecting oil pressure via the first valve.

* * * * *